(12) United States Patent
Hubner et al.

(10) Patent No.: US 6,943,869 B2
(45) Date of Patent: Sep. 13, 2005

(54) METHOD AND APPARATUS FOR MEASURING STRAIN USING A LUMINESCENT PHOTOELASTIC COATING

(75) Inventors: James P. Hubner, Gainesville, FL (US); Peter G. Ifju, Newberry, FL (US); Kirk S. Schanze, Gainesville, FL (US); Shujun Jiang, Xian (CN); Yao Liu, Gainesville, FL (US); David A. Jenkins, Gainesville, FL (US)

(73) Assignees: Resesarch Foundation, Inc., Gainesville, FL (US); Visteon Global Technologies, Inc., Dearborn, MI (US)

(*) Notice: Subject to any disclaimer, the term of this patent is extended or adjusted under 35 U.S.C. 154(b) by 167 days.

(21) Appl. No.: 10/407,602

(22) Filed: Apr. 4, 2003

(65) Prior Publication Data
US 2004/0066503 A1 Apr. 8, 2004

Related U.S. Application Data
(60) Provisional application No. 60/416,105, filed on Oct. 4, 2002.

(51) Int. Cl.[7] ............................................. G01B 11/16
(52) U.S. Cl. .......................................... 356/34; 73/800
(58) Field of Search ........................ 356/32–35; 70/800

(56) References Cited

U.S. PATENT DOCUMENTS

| | | | |
|---|---|---|---|
| 5,817,945 A | 10/1998 | Morris et al. | |
| 6,055,053 A | 4/2000 | Lesniak | |
| 6,122,042 A | 9/2000 | Wunderman et al. | |
| 6,219,139 B1 | 4/2001 | Lesniak | |
| 6,327,030 B1 * | 12/2001 | Ifju et al. | 356/32 |

OTHER PUBLICATIONS

Zandman et al., "Photoelastic Coatings," The Iowa State University Press, Ames, Iowa, 43–52, and 69–71, 1979.

* cited by examiner

Primary Examiner—Richard A. Rosenberger
(74) Attorney, Agent, or Firm—Akerman Senterfitt

(57) ABSTRACT

A method and apparatus for measuring strain on a surface of a substrate utilizes a substrate surface coated with at least one coating layer. The coating layer provides both luminescence and photoelasticity. The coating layer is illuminated with excitation light, wherein longer wavelength light is emitted having a polarization dependent upon stress or strain in the coating. At least one characteristic of the emitted light is measured, and strain (if present) on the substrate is determined from the measured characteristic.

38 Claims, 10 Drawing Sheets

(A)

(B)

(A)

(B)

(A)

High Strain Regions (B)

METHOD AND APPARATUS FOR MEASURING STRAIN USING A LUMINESCENT PHOTOELASTIC COATING

CROSS-REFERENCE TO RELATED APPLICATIONS

This application claims the benefit of U.S. Provisional Application No. 60/416,105 entitled METHOD AND APPARATUS FOR MEASURING STRAIN, filed on Oct. 4, 2002, the entirety of which is incorporated herein by reference.

STATEMENT REGARDING FEDERALLY SPONSORED RESEARCH OR DEVELOPMENT

Not applicable.

FIELD OF THE INVENTION

The invention relates to the field of strain measurement, more particular, to strain sensitive coatings which provide both photoelasticity and luminescence and methods for determining strain on surfaces coated with the same.

BACKGROUND

In the field of structural analysis, the ability to determine the stresses which a structural body experiences can provide important feedback in the design and construction, as well as the integrity during the service life of such structural bodies. Typically, surface strain on the structural member can provide information regarding the stresses that the body is experiencing. This information can lead to the identification of stress concentrations, over-stressed areas, and general stress mapping for comparison to and calibration of predictive and/or analytical methods. Currently, a number of methods exist for measuring surface strain, including point and full-field methods.

Point methods include electrical resistance strain gauge methods and methods employing electro-optic sensors and optical methods. These methods typically require affixing a plurality of sensors at various locations on a structural body, or stepping the sensor across the structural body. When the structure is stressed each sensor or step indicates the surface strain at individual discrete points. In order to determine the strain over an entire body, numerous sensors must be located at critically stressed points on the surface or numerous iterative steps are required when movable sensors are used. Accordingly, these point methods can be cumbersome, making it difficult to determine the stresses over an entire surface of a structure.

A number of surface measurement techniques have been developed to overcome the limitations of the point methods, including brittle coatings, photoelastic coatings, Moiré, interferometric, thermoelastic and digital image correlation methods. Each of these methods can be useful for certain applications, but each have certain characteristics which limit their usefulness. Brittle coatings typically provide good qualitative information about the principal stress directions on objects. However, conventional brittle coating techniques can only test a part in one loading configuration and can only provide limited quantitative information. Moreover, methods for automated data collection using conventional coating techniques are not presently available.

Photoelastic coatings provide the shear stress and principal stress direction information on objects. Conventional photoelastic coating techniques are typically cumbersome and time consuming to apply to large bodies. Moiré methods are typically limited to flat objects and are not used on complex three-dimensional geometries. Interferometric methods, such as holographic interferometry, electric speckle pattern interferometry and shearography, require sophisticated vibration isolation which greatly reduces their applicability. Thermoelastic methods require cyclical loading of the specimens to generate surface temperature gradients related to the stress field. Digital image correlation methods can lack the sensitivity required to test parts in the material linear range in regions of high strain gradients.

U.S. Pat. No. 6,327,030 to Ifju et al. (Ifju '030), which shares several common inventors with the present application, discloses a strain-sensitive coating, a strain measurement system, and a method to determine strains on substrate materials. Ifju '030 is herein incorporated by reference in its entirety. The disclosed system can include a strain field mapping system which can be used to create a full-field strain map of the mechanical strain on a substrate material. The luminescent strain-sensitive coating is preferably a polymer-based coating, and can incorporate one or more luminescent compounds, such as luminescent dyes. Appropriate illumination stimulates the dye, which in turn emits a longer wavelength luminescence signal. Differences in excitation and emission wavelengths permit optical filtering of these signals. One or more characteristics of the luminescence emanating from the coating can then vary in relation to the strain on the substrate material. In one embodiment, the change in the morphology of cracks in the coating can cause variation in one or more characteristics of the luminescence emanating from the coating such that the strain on the substrate material can be determined by measuring the luminescence emanating from the coating.

U.S. Pat. No. 6,219,139 to Lesniak discloses a structural specimen coated with or constructed of photoelastic material. When illuminated with circularly polarized light the coated specimen will upon stressing, reflect or transmit elliptically polarized light, the direction of the axes of the ellipse and variation of the elliptically light from illuminating circular light will correspond to and indicate the direction and magnitude of the shear stresses for each illuminated point on the specimen. A preferred spray coating is formulated to produce a coating which is of a thickness such that only a quarter wave of birefringence is produced when the maximum stress is imposed on the coated specimen.

Dyes are disclosed by Lesniak, but only non-luminescent dyes. Specifically, non-luminescent dyes are disclosed exclusively for providing light attenuation data sufficient to solve for the thickness of the coating. Since the attenuation difference between two wavelengths of light are not sufficient to solve for coating thickness when all three main sources of amplitude variation are considered, that being coating thickness, the surface of coating reflection, and reflection from the surface of the specimen, three dyes are required to provide information to solve the three unknowns. By adding one or more non-luminescent dyes to a photoelastic coating so that the attenuation of the three colors red, green, blue are each substantially different and of a known amount, a RGB camera can be used to provide data sufficient to solve for the three main sources of amplitude variation.

SUMMARY OF THE INVENTION

A method for measuring strain on a surface of a substrate includes the step of providing a substrate surface coated with at least one coating layer. The coating layer provides both luminescence and photoelasticity. The coating layer is illuminated with excitation light, wherein red shifted (longer wavelength) is emitted having a polarization which is dependent upon the stress or strain in the coating based on stress or strain on the underlying substrate surface. At least one characteristic of the emitted light is measured, and strain (if present) on the substrate is determined from the measured characteristic.

As used herein, the word "strain" can mean shear strain, normal strain, maximum principal strain, maximum shear strain and other strains. The photoelastic technique described herein is sensitive to the maximum shear strain in the plane of propagation of the light within the coating. If this plane is parallel to the plane of the surface, then the maximum in-plane shear strain is equal to the difference of the two in-plane principal strains $\epsilon_1$–$\epsilon_2$. If the plane is not parallel, which is the case for oblique excitation, the maximum in-plane shear strain (that is the plane of propagation) is a function of $\epsilon_1$, $\epsilon_2$, and $\epsilon_3$.

The coating layer can include at least one luminophore for providing luminescence. The luminophore is preferably a polarization preserving material.

The coating layer can be polarization generating. In this embodiment, the excitation light can be non-polarized light. In another embodiment, the excitation light comprises polarized light. The polarized light can be elliptically polarized light, including circularly polarized light.

The measured characteristic can include the maximum principal strain, the minimum principal strain and the maximum shear strain on the substrate surface. The measured characteristic can also include the direction of maximum principal strain and the direction of minimum principal strain.

The coating layer can be a single layer or two or more layers. The two layer embodiment can include a luminescent layer disposed on the substrate surface and a photoelastic layer disposed on the luminescent layer. In this embodiment, the luminescent layer can include a first luminophore and the photoelastic coating can include a second luminophore, wherein the first and second luminophore provide different emission wavelengths. The emission wavelength of the first luminophore can correspond to an absorption spectrum of the second luminophore. The coating can include one or more thixotropic additive.

The method can include the step of optical filtering to selectively pass the emitted higher wavelength light and to reject the reflected excitation light. An image can be formed based on information provided by the emitted higher wavelength light. The method can comprise the step of scanning the excitation light across the substrate surface to identify regions of high stress or strain.

The method can further comprise the step of providing the experimentally determined strain on the substrate surface to an analytical model, such as finite-element analysis (FEA) model. The model is then updated and its accuracy improved based on differences between the experimentally determined strain data and strain data generated by the model.

The illuminating step can comprise the process of oblique incidence. In this embodiment, the angle of propagation of light with respect to the incident surface is oblique to the surface of the coated substrate. By using multiple a plurality of excitation angles the determining step can provide the individual strains on the substrate ($\epsilon_1$ and $\epsilon_2$) using only the claimed method.

An apparatus for measuring strain includes an excitation light source for illuminating a surface of a substrate. The substrate includes a surface coating which provides both luminescence and photoelasticity. A detector is provided for measuring light emitted by the substrate surface responsive to the excitation light, the emitted light being at a longer wavelength and having a polarization modified as compared to the excitation light based upon stress or strain on the coating resulting from stress on or strain on the underlying substrate surface. A computer provides processing to determine strain in the substrate surface from analyzing the emitted light.

The excitation light source preferably provides polarized light. The apparatus can determine the maximum principal strain, the minimum principal strain and the maximum shear strain on the substrate surface, as well as the direction of maximum principal strain and the direction of minimum principal strain on the substrate surface. The apparatus can include a linear polarizer or a combination of a quarter wave plate and linear polarizer disposed between the object and the detector.

A coating for indicating strain on an underlying surface comprises at least one coating layer. The coating layer provides luminescence and photoelasticity, wherein the coating layer emits longer wavelength light having an altered polarization responsive to illumination with excitation light. The coating layer preferably includes at least one polarization preserving luminophore. The coating layer can be polarization generating. The coating layer can comprise a bisphenol A diglycidyl ether or a bisphenol A glycerolate diacrylate based polymer.

A coated structural member includes a substrate having a coating layer on its surface. The coating layer indicates strain on the substrate surface and includes provides both luminescence and photoelasticity. The coating layer emits longer wavelength light having a polarization dependent upon stress or strain on the coating layer resulting from stress or strain on the underlying substrate upon illumination with excitation light.

A method for real-time monitoring of strain in surfaces of mechanical components, comprises the steps of providing a mechanical element having at least one surface, the surface including at least one coating layer for indicating the strain on the surface. The coating layer provides both luminescence and photoelasticity, wherein the coating layer emits longer wavelength light having a polarization dependent upon stress or strain on the coating resulting from stress or strain on the underlying substrate responsive to illumination with excitation light. The mechanical element is utilized in a stress inducing application, which can include its intended use. Strains developed on the mechanical element are monitored during the utilizing step, the monitoring step comprising illuminating the coated surface with the excitation light, measuring at least one characteristic of the emitted light, and determining strain on the surface from the measured characteristic.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
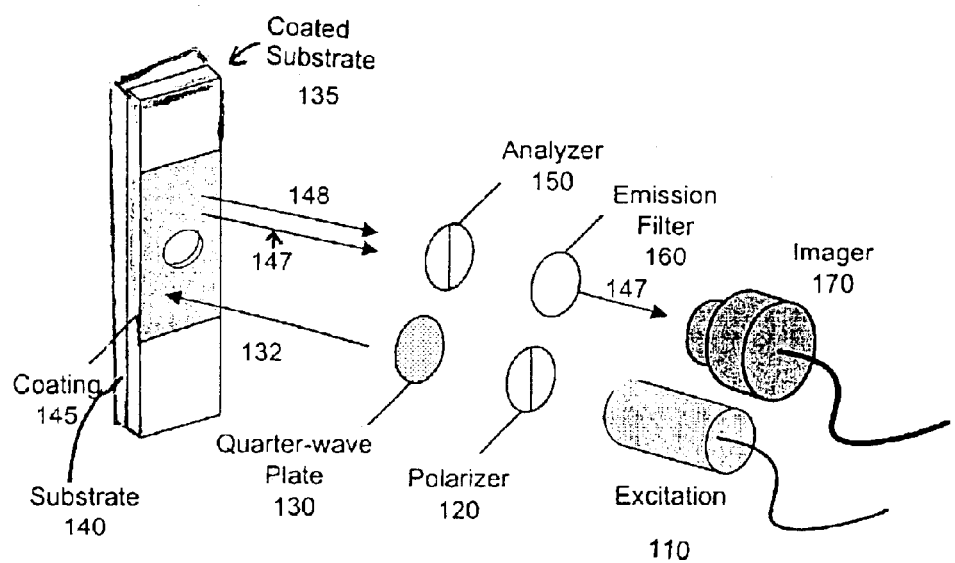
FIG. 1 illustrates a system for determining strain in objects coated with a luminescent photoclastic coating, according to an embodiment of the invention.

A method and apparatus for measuring strain on a substrate utilizes a substrate surface coated with at least one coating layer. The coating layer provides both luminescence and photoelasticity. The coating layer is illuminated with excitation light, wherein longer wavelength light is emitted having a polarization state dependent upon the stress or strain present on the coating. Thus, the invention utilizes emitted light, not reflected light from the coating. At least one characteristic of the emitted light is measured, and strain (if present) on the substrate is determined from the measured characteristic.

Photolelasticity relies on birefringence, and as used herein generally refers to stress or load induced birefringence where the material becomes birefringent, or experiences a change in birefringence, under the influence of stress or loading. The stress in the coating layer can be provided by a substrate (e.g. object) under stress, whether natural or stress induced, beneath the coating. Stress can originate from a variety of sources including thermal and mechanical forces.

By calibrating the relationship between strain in the substrate and the light emitted from the coating as compared to light incident on the coating, the coating can be used to provide quantitative measurements relating to the strain on the substrate, including a full field map of the strain. The measured characteristic can be based on one or more of the polarization, intensity, spectral position, band shape, and emission decay time of the light emanating from the coating. The invention allows determination of the magnitude of the difference of or the respective values of the two in-plane principal strains, the maximum shear strain, as well as the principal strain direction on the substrate.

The coating can be applied to mechanical or structural components, such as steel, aluminum, polymeric or composite components, and can be used for testing of prototypes to assist in shortening product design time. In addition, the invention can be applied to components during actual field use to provide strain data. The technology is non-contact, non-destructive and permits measurement of full-field strain, and is even applicable to objects with substantially non-planar (3D) substrate surfaces.

As used herein, the term "light" refers to electromagnetic radiation having wavelengths both within the visible spectrum and outside the visible spectrum. For example, the invention can generally be practiced with visible, infrared and/or ultraviolet light provided appropriate luminophores and detectors are provided.

Birefringent materials provide two different refractive indices, generally referred to as the extraordinary index $\eta_e$ and the ordinary index $\eta_o$. Light traveling through a birefringent material has a velocity, v, which is dependent upon its polarization direction given by Eq. 1:

$$v = c/\eta \tag{1}$$

where c is the speed of light in a vacuum and $\eta$ is the refractive index parallel to that polarization direction. By definition, $\eta_e$ is greater than $\eta_o$ for a positive uniaxial birefringent material. For a positive uniaxial birefringent material, the extraordinary axis is referred to as the slow axis, while the lower refractive index ordinary axis is referred to as the fast axis.

Light polarized parallel to the fast axis travels at a higher velocity than light parallel to the orthogonal slow axis. Thus, when plane (linearly) polarized light passes through a birefringent material in which the fast axis is tilted with respect to the axis of the polarized light, the polarized light is resolved into two orthogonal components, a first component being along the fast axis and a second component along the slow axis. This produces two components of the linearly polarized light that travel in the birefringent material and emerge from the birefringent material separated in time. When the fast axis and slow axis components are viewed through a polarizing filter, commonly referred to as an analyzer, which is properly oriented with respect to the emerging radiation, a component of each of the first and second components will be able to pass through the analyzer. Each component is resolved into a portion that is parallel to the analyzer, and the emanating light can be imaged.

FIG. 1 illustrates a system 100 for measuring the surface strain of a substrate 140, in accordance with one embodiment of the invention. The substrate 140 can be opaque or transparent. Although shown as a back-emission based system in FIG. 1, the invention can also be practiced in a corresponding forward-emission (transmission) mode for substantially transparent substrates 140.

Substrate 140 is coated with at least one coating layer 145 and together are referred to as the coated substrate 135. The coating layer 145 provides both luminescence and photoelasticity. In the embodiment shown in FIG. 1, a single coating layer 145 provides both photoelasticity and luminescence. However, the coating layer 145 can include at least two layers, such as a photoelastic layer disposed on a luminescent layer (see FIG. 3). In addition, coating 145 can include more than one different luminophore species.

The luminescence provided by coating layer 145 generates an emitted signal responsive to excitation radiation, as opposed to reflective signals produced by prior art strain sensitive coating systems, such as U.S. Pat. No. 6,219,139 to Lesniak. The use of an emitted signal in the present invention which is wavelength shifted relative to the excitation light provides several advantages over reflection based systems, such as optical filtering which permits separation of the desired emitted signal from the reflected signal, blockage of specular reflections, diffuse emission fields on complex geometries, and measurements on surfaces not normal to the propagation of the excitation or emission.

The light source 110 can be coherent or incoherent. For example, a non-polarized excitation light source 110 can be provided, such as one or more LEDs or laser diodes. The choice of light source 110 depends on the absorption wavelength(s) of the luminophore(s) in coating layer 145. For example, most commonly used luminophores provide absorption in the visible spectrum. For example, many laser dyes can be excited by blue light (400–500 nm). To regain the ground state electronic energy level, the laser dye emits fluorescent light at a longer wavelength, such as at about 650 nm.

A second luminophore which can fluoresce or absorb in a region of the visible spectrum that is distinct from the first luminophore can be used along with the first luminophore. This arrangement is referred to herein as a multi-luminophore coating which comprises at least two (2) different luminophore species. The added dye(s) is (are) also preferably soluble in the non-polar solvents used to deliver the coating. Suitable choices could include, for example, aromatic hydrocarbons and transition metal complexes. Examples of dyes which can be used with the invention include, but are not limited to anthracene, pyrene, rubrene, coumarins, and metal complexes such as rhenium and osmium. The additional emission information can provide assistance in measuring the strain accurately such as an emission signal that enables correction for coating thickness.

The first polarizing filter 120 is shown converting non-polarized light from light source 110 into plane (linearly) polarized light. System 100 is configured so that light output by polarizing filter 120 is oriented at an angle, such as 45 degrees, relative to the fast axis of the quarter wave plate 130. Quarter wave plate 130 is based on a birefringent or similar material. The quarter wave plate 130 decomposes the incident plane polarized light into two orthogonal components shown in reference 130 vibrating along both the fast and slow axes. The orthogonal polarization components travel through the quarter wave plate 130 with different velocities (due to birefringence) and are phase shifted relative to each other producing a modified polarization state. The transmitted light leaving the quarter wave plate can be considered to be two linearly polarized beams, each having an amplitude and phase. When the quarter wave plate 130 is wavelength-matched with the light source 110 and its extraordinary or ordinary axis is offset 45 degrees with respect to the first polarizer 120 alignment, a circularly polarized beam 132 emanates. Circularly polarized beam 132 is received by the coated substrate 135.

Coating 145 includes at least one photoluminescent material which provides absorption of the wavelength of light generated by excitation light source 110 and in response emits a red-shifted luminescent signal. The surface of coating 145 also produces a reflected signal 148, the reflected signal having a wavelength equal to the wavelength of the excitation radiation 132. Luminescence in the coating 145 can be generated by providing at least one luminophore, such as a luminescent dye, or other photoluminescent material. The photoluminescent dye is preferably selected from dyes which substantially retain the polarization of the incident light upon emission.

As noted above coating 145 also provides photoelasticity. Thus, light emitted by luminophores in coating 145, as well as the light generated by the illumination sources, is modified during travel though coating 145 due to the birefringence of coating 145 when strain is present in the coating 145, such as due to strain on the underlying substrate 140. For example, the strain in the coating 145 alters the state of polarization of emitted light, and the intensity of light as it traverses coating 145 as a function of the magnitude and direction of the strain field in coating 145. Emitted light 147 is altered by the birefringent coating 145 and is then processed by a second polarizing filter 150, which is commonly referred to as an analyzer, where it can be recombined. An emission filter 160, such as a bandpass or highpass emission filter (e.g. 650 nm bandpass filter), is preferably included to reject the reflected excitation radiation 148 and pass the longer wavelength luminescent signal 147. Although shown disposed post-analyzer 150, emission filter 160 may be disposed pre-analyzer 150.

By recombining the two components using an optical instrument such as analyzer 150, the corresponding intensity is related to the principal strain magnitude, $\gamma$, and direction, $2\theta$, as shown below in Eqs 2A–2D:

$$\frac{I}{I_o} = 1 + \delta \sin(2\alpha - 2\theta) \qquad (2A)$$

$$\delta = \Phi \sin(\Delta) \qquad (2B)$$

$$\Delta = \frac{2\pi K h}{\lambda^*} \gamma \qquad (2C)$$

$$\lambda^* = \frac{\lambda_{ex} \lambda_{em}}{\lambda_{ex} + \lambda_{em}} \qquad (2D)$$

where I is the intensity, $I_o$ is the average intensity over one analyzer period (180 degrees), $\alpha$ is the analyzer angle, $\delta$ is the amplitude response, $\Phi$ is the coating polarization efficiency, $\Delta$ is the angular retardation, K is the optical sensitivity of the photoelastic coating, h is the photoelastic coating thickness for normal excitation and emission, and $\lambda^*$ is an effective wavelength based on the filtered excitation and emission wavelengths.

In one embodiment of the invention, the photoelastic coating thickness is limited such that the angular retardation for the strain range of interest is less than $\pi/2$. For such an embodiment, the system operates in the sub-fringe environment, eliminating the need for phase-unwrapping and fringe counting necessary for conventional photoelastic techniques which use thick coatings or transparent photoelastic components.

The coating thickness can be designed for the expected strain level. A thinner coating is generally used for higher strains. Currently obtainable practical coating thickness are from about 10 microns to 1000 microns (1 mm) using conventional spraying techniques.

An imager 170, such as a CCD array, preferably including a plurality of independent sensing pixels which each correspond to different areas on substrate 140, receives the luminescent signal 147 (I in Eq. 2A) and forms an image. For example, a suitable computer or similar device (not shown) for receiving and processing image data compiled by imager 170 can be used to determine the various strain information based on Eqs. 2A–2D and related equations described hereafter. In the case where excitation radiation 132 incident on coated object 135 is elliptically polarized, the luminescent signal will be altered to another elliptical state based on strain in the coating 145 resulting from strain on the substrate 140.

In operation, a sequence of images can be acquired for a given state of strain by rotating the analyzer 150 through a plurality of analyzer angles, such as by −45, 0, 45 and 90 degrees with measurements made at each rotation angle. Other rotation angles can clearly be used. Alternatively, polarizing filter 120 and quarter wave plate 130 may be rotated together. Thus, through appropriate rotations, a prescribed set artificial intensity changes can be induced.

System 100 can be used with other strain measurement systems which measure the addition of the first and second in-plane principal strains ($\epsilon_1+\epsilon_2$), for example Ifju '030, to decouple principal strains. By combining the addition of the first and second in-plane principal strains ($\epsilon_1+\epsilon_2$) to the subtraction of the first and second in-plane strains ($\epsilon_1-\epsilon_2$) determined as shown above, the respective in-plane principal strains ($\epsilon_1$, $\epsilon_2$) can each be determined. In one embodiment, in performing the strain decoupling process, both tests can be run using the same testing component. Using the same part can eliminate the manufacturing variability induced by using different test parts. The strain decoupling capability of the subject invention can allow further calibration of the analytical and computation models, and allow the performance of fatigue/durability service life predictions as crack initiation is typically driven by the maximum principal strain, $\epsilon_1$.

In another embodiment of the invention, the principal in-plane strains can be measured individually using only the luminescent photoelastic coating technique described below by employing a process of oblique excitation and/or emission. The general theory of oblique incidence applied to conventional photoelastic coatings to resolve the maximum principal strain is disclosed in a book entitled "Photoelastic Coatings" by Zandman, et al., Iowa State University Press, Ames, 1979. In this inventive embodiment, the coated substrate 135 is illuminated by a light source 110 with a linear polarizer 120 and quarter wave plate 130 such that the angle of propagation of light with respect to the incident surface is not perpendicular but oblique to the surface of the coated substrate 135. The range of generally effective oblique angles is greater than about 30 degrees, preferably from about 45 to 60 degrees. The excitation wave traveling through the photoelastic overcoat is retarded with respect to the plane normal to the propagation direction. This plane orientation is a function of the incidence angle relative to the substrate surface and the refractive index of the coating.

The relative retardation includes the effect of the in-plane principal strains for the coating as well as the out-of-plane principal strain, $\epsilon_3$, experienced by the coating such that the maximum in-plane shear strain in the new plane, $\gamma$ in Eqs. 2C, is a function of $\epsilon_1$, $\epsilon_2$, and $\epsilon_3$. Using a plurality of oblique excitation angles with a light source or multiple light sources, sufficient information can be attained to solve for both $\epsilon_1$ and $\epsilon_2$. In general, the greater the angle of oblique incidence, the more sensitive the measured response is to the out-of-plane strain on the coating.

Additionally, the imager 170 can be positioned such that it is obliquely positioned with respect to the surface of the substrate 140, and hence, the retardation of the emission from the luminescent dye will be a function of the out-of-plane principal strain. Similarly, a plurality of imager 170 positions could be used to acquire sufficient images to resolve the two in-plane principal strains, independently.

When an image sequence is acquired for a specified loading state, the state of strain information will be a combination of both the residual stresses of the coating 145 and the true "load-applied" stresses of the substrate 140. In some applications, it is desirable for these residual stresses to be accounted for. Calibration of emission from the coating 145 with no load applied to substrate 140 is preferably done a priori to the measurement. Thus, a sequence of images in the unloaded state can be taken and utilized to account for residual stress state by analyzing the image set as described above so as to yield a full-field measurement. At each load condition, the measured light intensity can be referred to as the combined signal. The residual signal, acquired at no load, can be decoupled from the combined signal.

Figure 2:
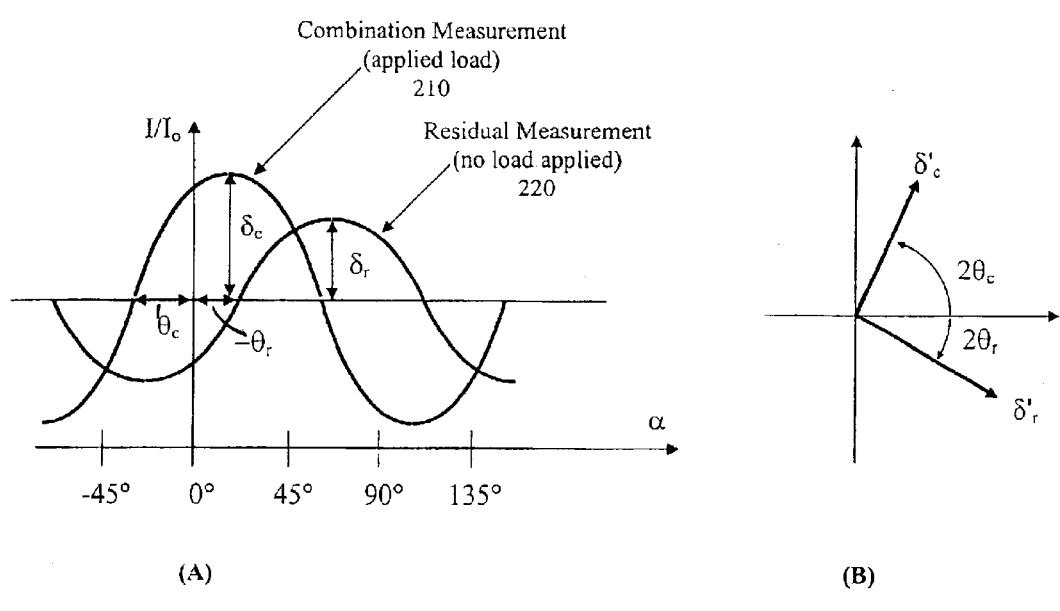
FIG. 2A is a plot of normalized intensity and phase of an emitted signal from a substrate coated with a luminescent photoelastic coating with a load applied as compared to no load applied, the data compiled by rotating an analyzer in 45 degree increments.
FIG. 2B is a vector form presentation of the data shown in FIG. 2A.

As shown in FIG. 2A a sinusoidal function can be fit through multi-point analyzer data for a given load application. In FIG. 2A a sinusoidal function is fit to the ratioed intensity response $I/I_o$ for the cases of a load applied 210 and no load applied 220. The variables $\delta_c$ and $\theta_c$ are the amplitude response and phase with load applied 210, while $\delta_r$ and $\theta_r$ are the amplitude response and phase with no load applied 220, respectively. Alternatively, as illustrated in FIG. 2B, the loaded and unloaded intensity responses can be equivalently presented in vector form.

Vector decoupling can be utilized to determine the load-applied stresses. Decoupling equations which can be used are provided below as Eqs. 3A–3D:

$$\Delta = \sin^{-1}\left(\frac{\delta}{\phi}\right) \quad (3A)$$

$$\Delta_t e^{i2\theta_t} = \Delta_c e^{i2\theta_c} - \Delta_r e^{i2\theta_r} \quad (3B)$$

$$\Delta_t = \sqrt{(\Delta_c \sin(2\theta_c) - \Delta_r \sin(2\theta_r))^2 + (\Delta_c \cos(2\theta_c) - \Delta_r \cos(2\theta_r))^2} \quad (3C)$$

$$2\theta_t = \tan 2^{-1}\left(\frac{\Delta_c \sin(2\theta_c) - \Delta_r \sin(2\theta_r)}{\Delta_c \cos(2\theta_c) - \Delta_r \cos(2\theta_r)}\right) \quad (3D)$$

where the subscripts c, r, and t represent the combination, residual, and true states of strain. Both Δ and 2θ are functions of pixel location. Prior to decoupling but after the residual and combination vector maps are determined, the combination amplitude response and phase maps can be registered to the residual amplitude response and phase maps to account for rigid body movement and/or deformation. At each load or unloaded case, the strains can be defined using the series of analyzer images at that condition. The image at each analyzer angle for a set load condition can be acquired under the same excitation field, such that there is no movement amongst the image set.

The system and method can allow measurement of full-field in-plane shear strain maps (diameter of the Mohr circle) on the surface of substrates, such as test prototypes, having a variety of sizes and shapes. The method can obtain strain data which would have required thousands of strain gauges applied onto the object for test can be used as a predictive tool to identify the design critical regions, and can provide data for evaluating and calibrating analytical models (such as finite-element analysis (FEA)) for prototype design optimization.

Although the system 100 shown in FIG. 1 uses a polarizer 120 together with a quarter wave plate 130 to produce circularly polarized light as generally described above, circularly or ordinary elliptically polarized light can be produced in other known fashions. Although a quarter wave plate 130 is described, and may be convenient, other apparatus can be utilized to create elliptically or circularly polarized light.

In addition, although the invention preferably utilizes circularly polarized light incident on the coated substrate surface, circularly polarized light is not required to practice the invention. For example, non-circularly polarized elliptical incident light can also be used. However, non-circularly elliptically polarized incident light can add complexity to the strain analysis as compared to when circularly polarized incident light is used.

It is also possible to utilize linearly polarized incident light with the invention. For example, in one embodiment, linearly polarized light can also be used by directing the first light beam having a linear polarization and a second light beam, from the same or different light source, having a linear polarization which is orthogonal or non-parallel to the polarization of the first light beam on the coating. The response of the coating emission for this embodiment would have an ellipticity relating to the state of strain of the coating and the orientation of linear polarization of the excitation. The ellipticity of the emission response could be quantified with the appropriate optics and imager, for example using analyzer 150, filter 160, and imager 170 shown in FIG. 1. An appropriate process would be used to determine the strain magnitude and orientation.

Although the invention is generally practiced by providing polarized incident excitation light, it may also be possible to use non-polarized incident excitation light. For example, this embodiment could eliminate the need for both polarizer 120 and quarter wave plate 130 from the system shown in FIG. 1. In one embodiment, luminophore molecules can be selectively oriented in the coating 145, such as in a luminescent polarizing undercoat layer with a photoelastic overcoat layer. This can permit luminophores to act as a back lighting source which can emit polarized radiation responsive to non-polarized excitation radiation. In this embodiment the photoelastic overcoat layer modifies the polarization state of the polarized radiation emitted by the luminophores, but not the excitation for the light sources, based on strain in the substrate underlying the coating.

Figure 3:
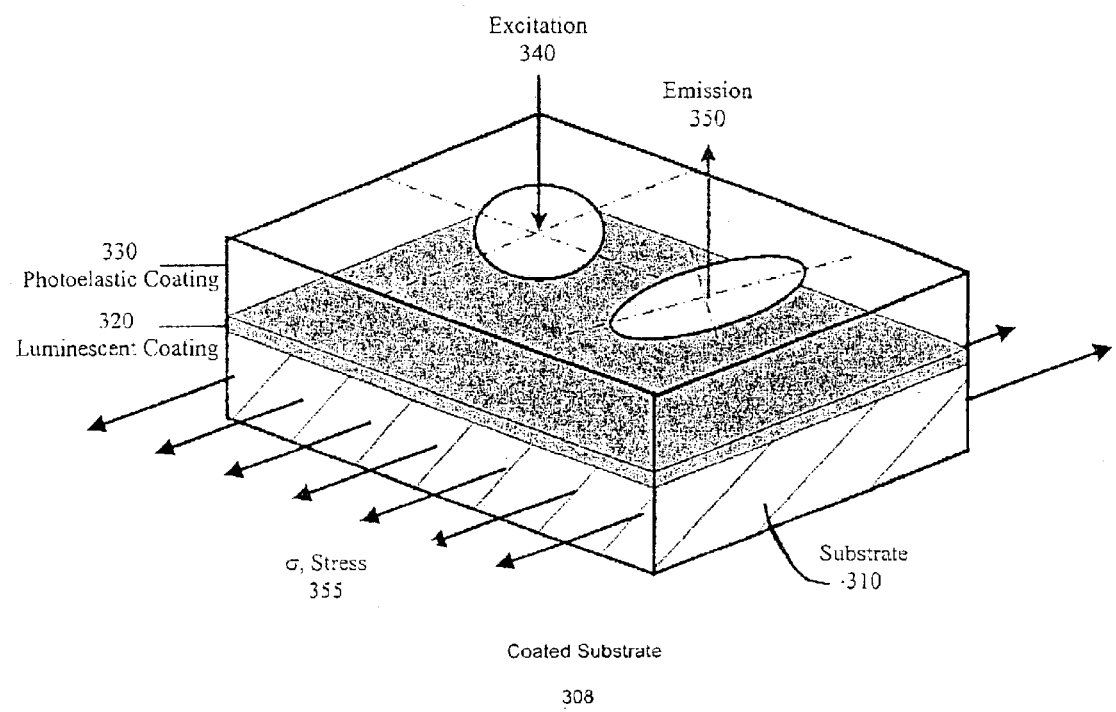
FIG. 3 illustrates a coated substrate including a luminescent photoelastic coating comprising a photoelastic layer disposed on a luminescent layer, the luminescent layer disposed on a substrate, according to another embodiment of the invention.

As noted above, the coating 145 can comprise two or more discrete layers. FIG. 3 illustrates a coated substrate 300 including a luminescent photoelastic coating comprising a photoelastic layer 330 disposed on a luminescent layer 320, the luminescent layer 320 disposed on a substrate 310. The luminescent layer 320 provides a back lighting source. The substrate 310 is shown having a uniform stress 355 (σ) therein.

Excitation light 340 is shown directed toward the surface of coated substrate 300. Excitation light 340 includes two orthogonal polarization components which interact with luminophores (not shown) in luminescent coating 320 to produce an emission signal 350. Emission signal 350 includes two orthogonal polarization components which are altered relative to their relationship in excitation light 340 due to strain induced birefringence in the photoelastic coating 330.

In a two-layer coating embodiment, the coating can comprise a luminescent coating layer 320 containing a visible light fluorescent compound in a polymer binder as a luminescent undercoat applied over the substrate 310. The luminescent coating layer can have a thickness of from about 20 to 80 μm. Examples of visible light luminescent dyes are cyanine, rhodamine, coumarin, stilbene, perylene, rubrene, perylene diimide, phenylene ethynylene, phenylene vinylene, and tetraphenylporphyrin. Examples of the polymer binder include, but are not limited to, polyurethane, polyacrylate, cellulose acetate and poly(dimethylsiloxane).

The substrate surface can be cleaned with acetone and hexane and/or lightly sanded (preferably >240 grit). The substrate is then preferably coated with a thin layer (about 10–20 μm) of black primer to provide a uniform, diffuse background. The black primer layer is generally cured for about 1 hour at 25° C. The substrate is then coated with the layer of polymer including one or more dissolved luminescent dye.

A sample formulation includes luminescent dye rhodamine B, (0.02–1% by weight) a polyurethane binder cone part, along with one part per volume ethanol. The mixture can be stirred for about 10 minutes then is ready for application. The rhodamine-polyruethane coating can then be applied directly onto the black primer layer using an airbrush. The polyurethane coating can be cured at ambient temperature overnight.

Photoelastic coating 330 comprising an epoxy overcoat including an epoxy binder having a thickness of about 50 to 500 μm can be disposed over the luminescent layer 320. The epoxy coating is typically applied in sequential coatings (ca. 50–751 m each) followed by 5 minutes exposure to a near-UV light source to effect curing. The final coating can be cured by exposure to near-UV light for about 1–2 hrs at about 25° C.

One exemplary epoxy photoelastic overcoat 330 which can be used with the invention is derived from the BGM monomer. The structure for the BGM monomer is shown below as Structure 1.

Structure 1

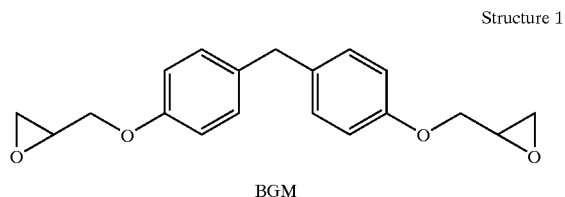

BGM

The BGM monomer has the following specifications:
Formula weight: 312.37 g-mol$^{-1}$, mp. −15° C.
Density: 1.19 g-mL
Viscosity (25° C.) 2000–3000 cps.

The BGM based epoxy coating can be cured using acid or base catalysts. For example, a photogenerated acid catalyst system based on a triarylsulfonium hexafluorophosphate salt (TAS) 50% by weight in a propylene carbonate solution can be used. Alternatively, the coating can be cured by exposing the coating to ultraviolet (UV) radiation. In one embodiment, the curing of the epoxy coating can take place or near room temperature, for example 20–25° C. for 2 hrs and at 50–60% relative humidity (RH), hence not requiring curing equipment such as an oven. The cured coating, an epoxy, exhibits the phenomenon of birefringence.

Another exemplary photoelastic material which can be used with the invention is formed from the curing of the bisphenol-A glycerolate diacrylate monomer. The structure for this monomer is shown in Structure 2. This monomer is quite viscous and can be cured by typical acrylate initiators. This epoxy monomer is an acrylate ester and generally shares properties with other acrylate coatings. Use of this epoxy monomer can produce an easily applied acrylate coating which has reduced flow after air brush deposition. The structure for the bisphenol-A glycerolate diacrylate monomer is shown below as Structure 2.

spraying the viscosity of the applied and uncured film can be higher. The higher viscosity of the uncured film can reduce film flow.

Silica gel can be used as a thixotropic additive. A specific photoelastic coating formulation can include BGM (40–60%), TAS (1–10%), AT-924 (1–20%), fumed silica gel (0.1–5%), chloroform (20–30%) and toluene (10–20%), where all values are listed in % by weight. At-924 is a commercially available photocured epoxy formulation from Adherent Technologies, Inc. Albuquerque, N. M. This coating can apply well, resist flowing, and results in a film that is level.

The amplitude response, δ, shown in Eqs. 2B–2C, is related to the thickness of the coating. For normal excitation and emission, the effective length of retardation, $h_{\mathit{eff}}$, through the coating is twice the coating thickness, h. This increases for off-axis (oblique) excitation, $\beta_{ex}$, or emission, $\beta_{em}$, and is also related to the index of refraction of the photoelastic coating such that $h_{\mathit{eff}}=f(\beta_{ex}, \beta_{em}, \eta)>2$ h. There are several non-invasive methods that can be used with the invention to provide a full field determination of the thickness of the photoelastic layer. For example, ratiometric fluorescence imaging can be utilized to extract full-field images that provide a quantitative measure of the thickness of the coating. Such images can then be used in matrix algorithms to correct the strain data for coating thickness non-uniformity.

One example of a ratiometric method for thickness correction utilizes the variation of the coating's fluorescence as a function of coating thickness for a plurality of wavelengths, wherein the coating exhibits a fluorescence intensity that varies independently as a function of coating thickness at two or more different fluorescence wavelengths. This concept is illustrated in FIGS. 4A and 4B.

Figure 4:
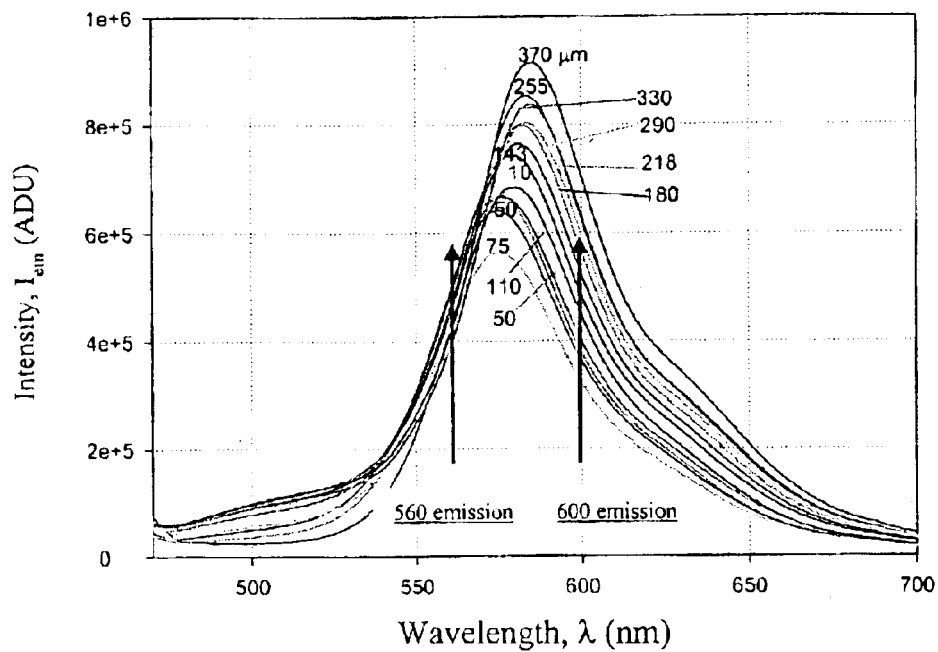
FIG. 4A illustrates the spectral response (emission intensity versus wavelength) for a luminescent photoelastic coating with the luminescent probe in the undercoat. The relative change in intensity is not the same for all wavelengths due to a detected luminescence interaction of the photoelastic overcoat.
FIG. 4B illustrates the trend between the ratio of the emission intensity at 600 nm to 560 nm with respect to coating thickness for the data shown in FIG. 4A. This information can be used to calibrate for coating thickness.
Figure 4:
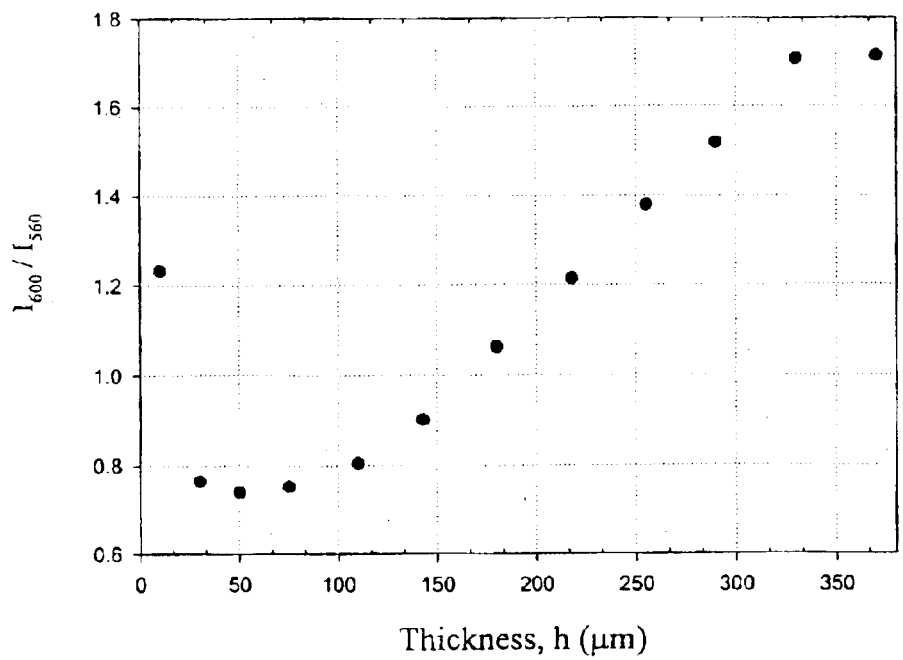

FIG. 4A shows the spectral response of a constant thickness rhodamine-polyurethane undercoat and a varying thickness epoxy overcoat (50–400 μm) system when excited by non-polarized blue illumination (450 nm). As the coating thickness increases, the fluorescence intensity increases. The Structure 2

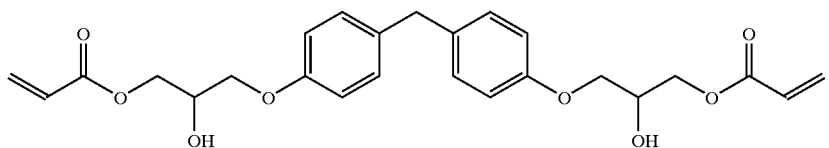

In one embodiment, a specific photoelastic coating formulation can include bisphenol-A glycerolate diacrylate (40–60%), chloroform (20–30%), toluene (10–20%) and benzoin ethyl ether (1–8%), where all values are listed in % by weight. The epoxy coating can be applied to the luminescent undercoat and cured by exposure to UV light for about 1 hour at ambient temperature.

A variety of other optically transparent photoelastic materials can be used with the invention, such as polycarbonate or polymethylmethacrylate. Preferred materials are optically transparent in the wavelength range of interest, provide high polarization sensitivity, provide high optical sensitivity, have low surface roughness, have low viscosity or alterable viscosity with additives, have good adhesion qualities, and have reasonable curing times and conditions.

A "thixotropic" additive can also be added to the coating. A thixotropic additive can make the viscosity of the coating material vary with shearing. For example, the viscosity can be low during spraying due to the shear stress, but after relative change in measured emission intensity with respect to thickness is different at different wavelengths. At 560 nm, there is little change with respect to thickness. However, at 600 or 650 nm, there is a greater change in the raw emission change with respect to thickness. The relative change in spectral shape is due to the competing emissions from the luminescent undercoat and the natural luminescences of the overcoat.

FIG. 4B compares the ratio of emission intensities collected with center-wavelength of 560 nm to 600 nm, clearly demonstrating a trend which can be exploited to measure coating thickness. Such a method of thickness calibration can be referred to as dual wavelength imaging.

A multi-luminophore coating comprising two (2) coating layers each containing different luminophore species can provide another method for non-contact thickness measurement. The two layer multi-luminophore coating can include a luminescent undercoat including a first luminophore and a photoelastic coating containing a second (different) luminophore disposed on the undercoat layer to correct for the effective thickness due to oblique angles and spatial thickness variations. The emission wavelength of the first luminophore can match the absorption spectrum of the second luminophore. For example, non-polarized excitation light can excite a luminescent undercoat which can in turn excite the luminescent and photoelastic overcoat to create longer wavelength emission proportional to the thickness of the photoelastic overcoat, enabling a means to optically detect coating thickness.

In an exemplary multi-luminophore embodiment, the undercoat can comprise of a commercially available binder including a blue emitting luminophore. The overcoat can be epoxy based and include a red-emitting luminophore. A black primer coat is preferably first disposed on the object to be coated. Commercially available flat black enamel spray paint can be applied to the substrate with a thickness of about 10 to 20 $\mu$m. A luminescent undercoat comprising is then applied to black layer. Acetone can be used as a solvent for the undercoat. An exemplary mixing ratio for a luminescent undercoat is blue emitting dye (1%), cellulose acetate 56 m., and acetone 8 ml.

The epoxy overcoat, which provides photoelasticity and the second red-emitting luminophore can be mixed. These components are preferably stirred in a sealed flask for 8 hours. The two luminophore coatings can provide a polarization efficiency, $\Phi$, of about 20% and an optical sensitivity, K, of about 0.12 at T=295 K.

Figure 5:
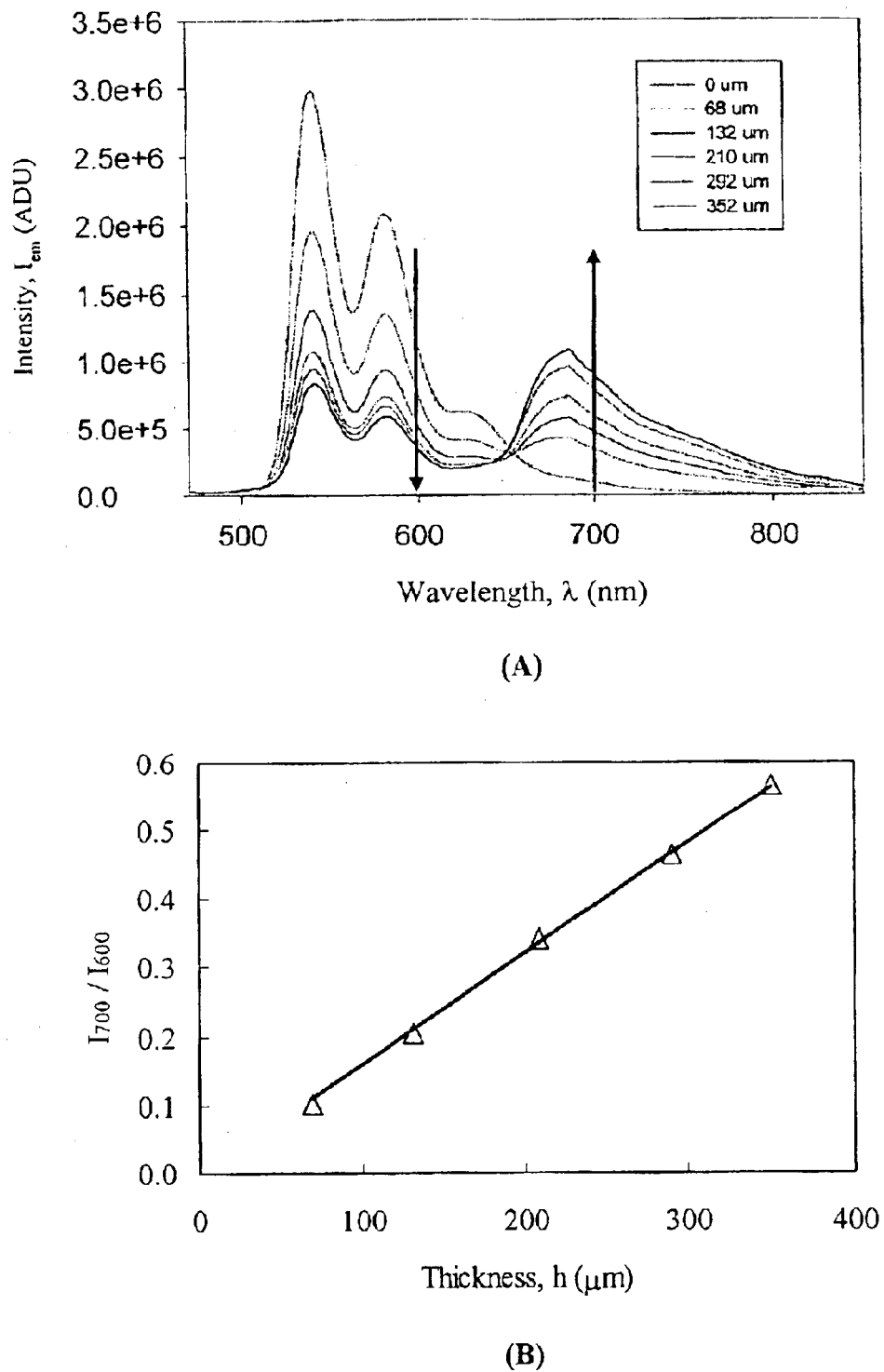
FIG. 5A illustrates the spectral response (emission intensity versus wavelength) for a luminescent photoelastic coating with a luminescent probe in the undercoat and a different luminescent probe in the photoelastic overcoat. The relative change in intensity is not the same for all wavelengths due to the interaction in luminescence between the two luminescent probes.
FIG. 5B illustrates the trend between the ratio of the emission intensity at 700 nm to 600 nm with respect to coating thickness for the data shown in FIG. 5A. This information can be used to calibrate for coating thickness.

Results for a dual-luminophore system which provides thickness correction as described above is shown in FIGS. 5A and 5B. FIG. 5A shows the spectral response of a constant thickness undercoat and a varying thickness photoelastic overcoat (50–400 $\mu$m) system when excited by non-polarized blue illumination (450 nm). As the coating thickness increases, the emission intensity decreases between the wavelength range of 500–650 nm and increases for wavelengths over 650 nm. For the range less than 650 nm, the Pe emission is dominant. It in turn stimulates or pumps the red-dye's emission, which is proportional the photoelastic overcoat thickness, in the range of 700 nm. The opposite trends of the emission intensity response at the different wavelengths can be utilized to measure coating thickness.

FIG. 5B compares the ratio of emission intensities collected at center-wavelength of 600 nm to 700 nm. The linear trend can be used to measure coating thickness. Such a method of thickness calibration can be referred to as multi-luminophore imaging.

In an alternate embodiment of the invention, the experimentally collected strain data regarding the coating can be provided to an analytical model (e.g. FEA) for model comparison, evaluation, and update. Two methods are described below to connect experimentally derived strain data to analytic models. In both methods, local absolute differences in values between experimentally determined and model derived data is used for model modification and update. Generally, as the number of data points used to modify the analytical model increases, the results generated by the model become increasingly accurate.

The first method comprises discrete point analysis where dots are dispersed randomly on the surface of the physical parts. The coordinates of these discrete points are measured using a coordinate measuring machine (CMM). Also, the measured strain values from the coating are experimentally determined at these points. Using the coordinates of these discrete points, nodes are built in analytic models whose calculated strains are extracted for direct comparison with the experimentally collected strain values and modification of the analytical model.

The second method comprises the step of measuring full-field strain data in the coating using a digitizing imager, such as pixilated camera. Accordingly, each pixel has a set of coordinates with reference to the camera coordinate system. The image resectioning matrix method is used to map the 2D camera data to a new set of 3D coordinates. The new 3D coordinate value for each pixel is then compared to the coordinates of nodes included in the analytical model. The pixels and nodes having similar coordinates can be used for direct comparison, evaluation, and modification of the analytical model. The second method is generally preferred as it permits a larger number of data points to be transferred into the analytical model as compared to the first method.

EXAMPLES

The present invention is further illustrated by the following specific examples. The examples are provided for illustration only and are not to be construed as limiting the scope or content of the invention in any way.

Example 1

Method Flow Chart

Figure 6:
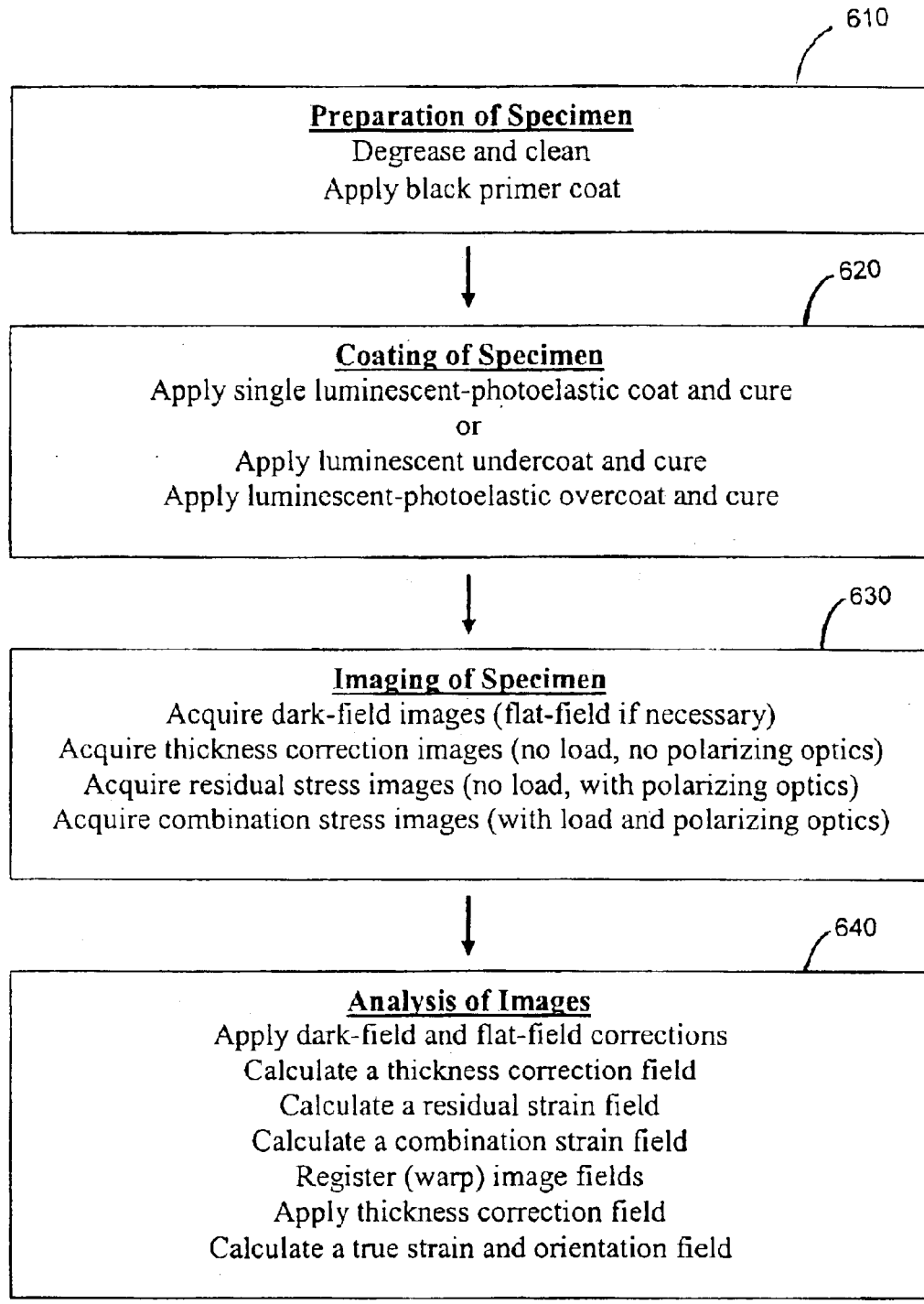
FIG. 6 is a flow chart which lists steps to measure the full-field shear strain and strain orientation in substrate surfaces.

FIG. 6 is a flow chart which lists steps generally used to measure the full-field shear strain and strain orientation on substrate surfaces. The flow chart includes descriptions for specimen preparation, coating, imaging, and analysis, using a typical luminescent photoelastic coating and a measurement system, such as system 100 shown in FIG. 1.

In step 610, the specimen to be tested is prepared. The specimen is sandblasted, degreased and cleaned. A black undercoat is then applied. In step 620, the specimen is coated. This step can involve applying a single luminescent-photoelastic coating and then curing. Alternatively, step 620 can comprise applying a luminescent undercoat, curing the undercoat, then applying a luminescent-photoelastic overcoat then curing the overcoat. For example, a RhoB// polyurethane coating (60–80 $\mu$m) can be cured under normal room conditions (25 C., 50%–60% RH). A BGM overcoat (200–400 $\mu$m) can then be applied and be UV cured at normal room conditions.

In step 630, the specimen is imaged. dark field images are acquired and flat-field images are obtained if necessary. Thickness correction images are then obtained under no applied load, using blue excitation, no polarizing optics and narrowband emission filters. Residual stress images are then obtained under no applied load, using blue excitation, polarizing optics, and an emission filter. Finally, combination stress images are obtained under an applied load, using blue excitation, polarizing optics and an emission filter.

Step 640 comprises analysis of the images obtained. Analysis can comprise the steps of applying dark field and flat field (shifted images only) corrections, calculating a thickness correction map, calculating a residual strain map, calculating a combination strain map. If necessary, register (warp) images are obtained with the applied load. The thickness correction map is applied to the residual and combination maps. The true (load induced) strain map is then calculated.

Example 2

Luminescent Undercoat Polarized Emission

A single layer of luminescent photoelastic coating containing a blue emitting dye (0.1%), dissolved in an epoxy monomer (1 g), along with a photocure agent (1%), a thixotropic agent, chloroform (0.25 mL) and toluene (0.25 mL) solvents was sprayed onto a metal surface and cured using UV irradiation (365 nm). A set of four fluorescence spectral scans were performed using a spectrophotometer to determine the degree in which the luminescent photoelastic coating retained the polarization state of the excitation. The excitation (450 nm) was filtered with a linear polarizer in the vertical and horizontal positions. The coating emission was detected thorough a second polarizer in the vertical and horizontal positions relative to each excitation polarizer (a total of four cases: $I_{VV}$, $I_{VH}$, $I_{HV}$, $I_{HH}$). From the data, the wavelength dependent anisotropy can be calculated as shown in Eqs 4A and 4B:

$$r = \frac{I_{VV} - GI_{VH}}{I_{VV} + 2GI_{VH}} \quad (4A)$$

$$G = \frac{I_{HV}}{I_{HH}} \quad (4B)$$

A value of r=0 would indicate that the luminescence of the dye does not retain the polarization of the excitation (the emission is anisotropic).

Figure 7:
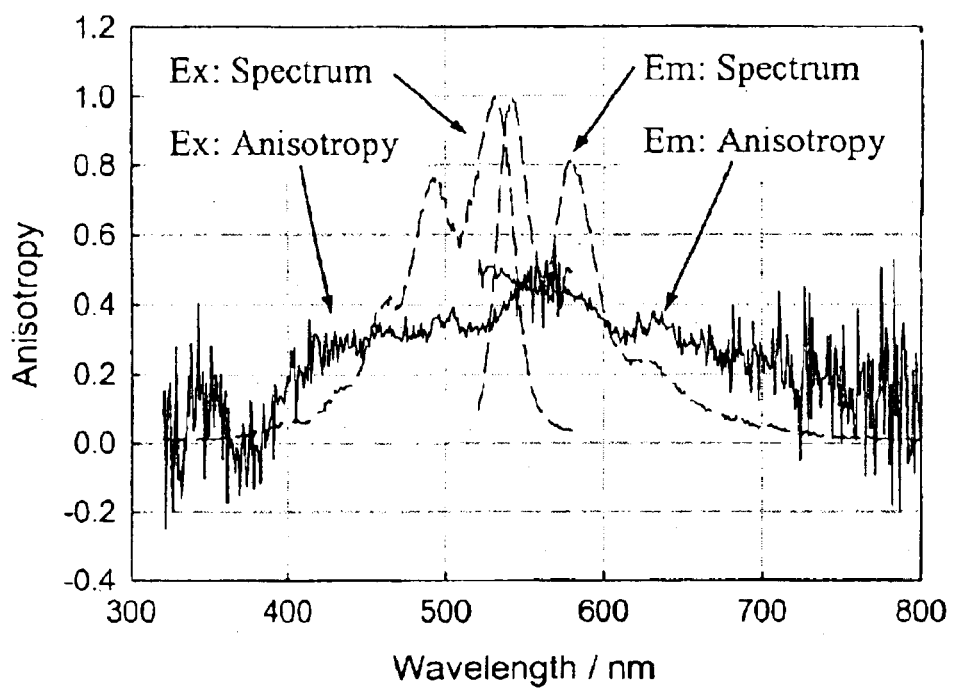
FIG. 7 illustrates normalized absorption and emission spectra as well as the excitation and emission dependent anisotropy for a luminescent polyurethane undercoat with perylene dye. A positive value for emission anisotropy indicates that the luminescent undercoat retains the polarization state of the excitation.

FIG. 7 shows results for the luminescent photoelastic coating as well as spectral absorption and emission curves. The ability of the coating to retain the polarization state of the excitation is indicated by values of anisotropy. Anisotropy is preferably positive and ranging between at least 0.2 and 0.4 at wavelengths of 600 to 700 nm for a nominal emission wavelength of 650 nm, provided by the blue dye. Thus anisotropy provided by the coating shown in FIG. 7 maintains the state of polarization of the excitation. in addition, the spectral emission shows substantial red-shifting from the excitation.

Example 3

Shear Strain Data on a Flat Specimen

An aluminum bar (2.0"×0.5" in cross-section) was degreased and prepared for undercoat and overcoat application of a two-coating luminescent photoelastic coating as described above. The specimen was placed in an apparatus such that it was simply supported from underneath and loaded with a downward force from above to create a three-point bend as shown in the image provided by FIG. 8A. The coating was excited using a blue LED lamp ($\lambda$=465 nm) coupled with a linear polarizer and quarter wave plate. A 600 nm (40 nm bandpass) interference filter was used on the CCD imager to detect and record the emission intensity analogous to system 100 shown in FIG. 1.

Figure 8:
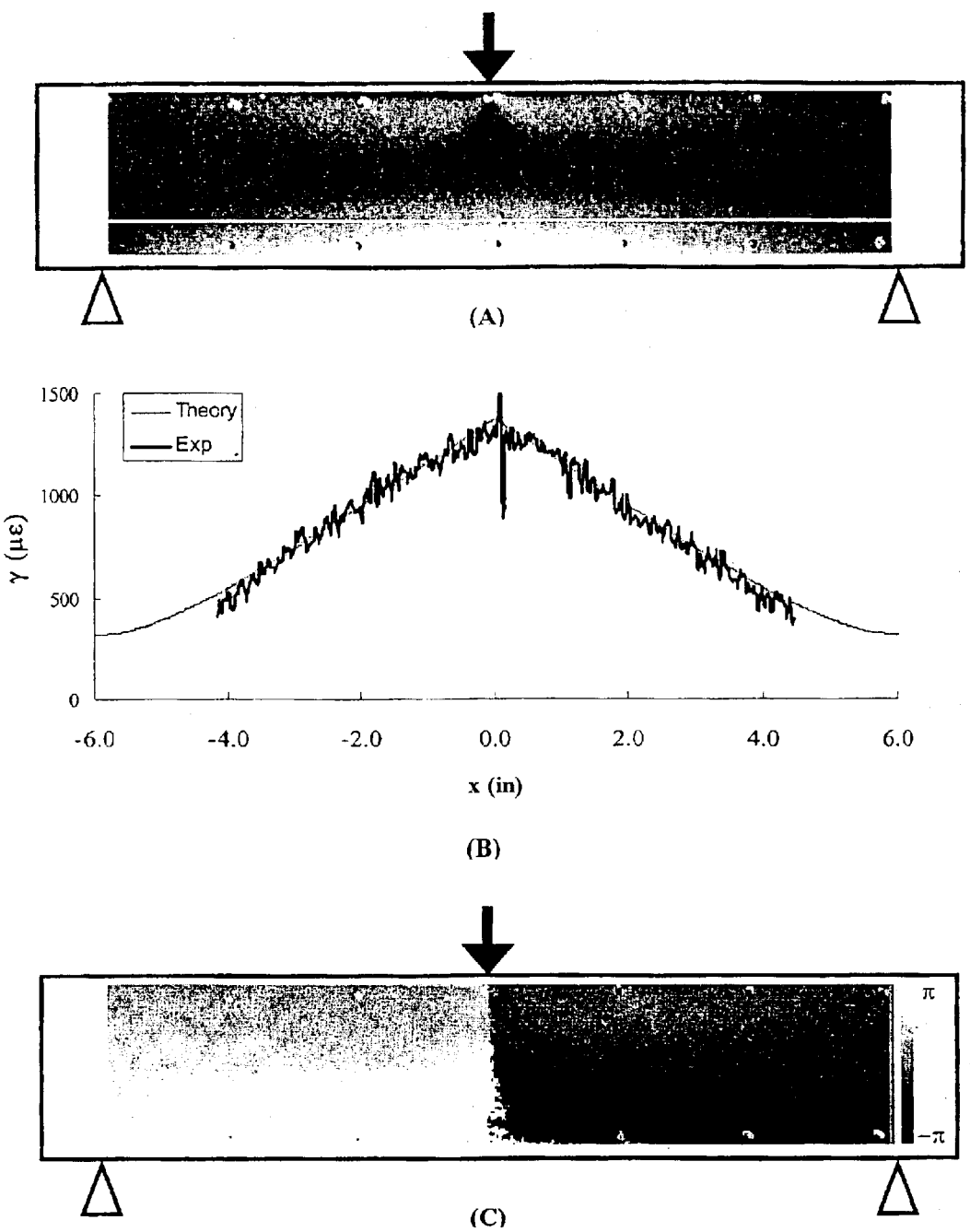
FIG. 8A is a shear strain image results for an aluminum specimen loaded in a three-point bend configuration. The grayscale images indicate low strains for black to dark gray and high strains for light gray to white. This example demonstrates the measurement system response to a shear strain field with spatial gradients.
FIG. 8B is a comparison of the measured shear strain using the luminescent photoelastic coating (as shown along the white horizontal line in FIG. 8A) and the calculated shear strain using simple beam theory showing close agreement.
FIG. 8C is an image showing processed principal strain orientation results for an aluminum specimen loaded in a three-point bend configuration where 0 (medium gray) would indicate compression along the horizontal axis and $\pi$ (white) or $-\pi$ (black) would indicate tension along the horizontal axis.

Images were acquired at four analyzer positions for each applied static load condition. FIG. 8A shows processed strain results for a given applied load. Regions of high shear are indicated by white and light gray areas. Clearly present is the spatially varying shear strain field. Beneath the contract point of the downward applied force is the presense of contact stresses.

FIG. 8B is a comparison of the measured shear strain using the luminescent photoelastic coating (as shown along the white horizontal line in FIG. 8A) and the calculated shear strain using simple beam theory showing close agreement. measurements shown were made for a horizontal line away from the area of contact stresses.

FIG. 8C is processed principal strain orientation results for an aluminum specimen loaded in a three-point bend configuration where 0 (medium gray) would indicate compression along the horizontal axis and $\pi$ (white) or $-\pi$ (black) would indicate tension along the horizontal axis.

Example 4

Shear Strain Data on a Cylindrical Specimen

An aluminum cylinder (0.25" thickness, 1.5" OD) was degreased and prepared for the undercoat and overcoat application of a two-coating luminescent photoelastic coating as described above. The specimen was machined with a necked-down region (1.375" OD) along the center of the specimen to create a stress concentration. It was placed in an apparatus such that a torsional load was applied to one end of the cylinder and supported to constrain rotation at the other end. The coating was excited using a blue LED lamp ($\lambda$=465 nm) coupled with a linear polarizer and quarter wave plate. A 600 nm (40 nm bandpass) interference filter was used on the CCD imager to detect and record the emission intensity (similar to the system 100 shown in FIG. 1). Images were acquired at four analyzer positions for each applied static load condition. Two CCD imagers were used to acquire images of an overlapping area.

Figure 9:
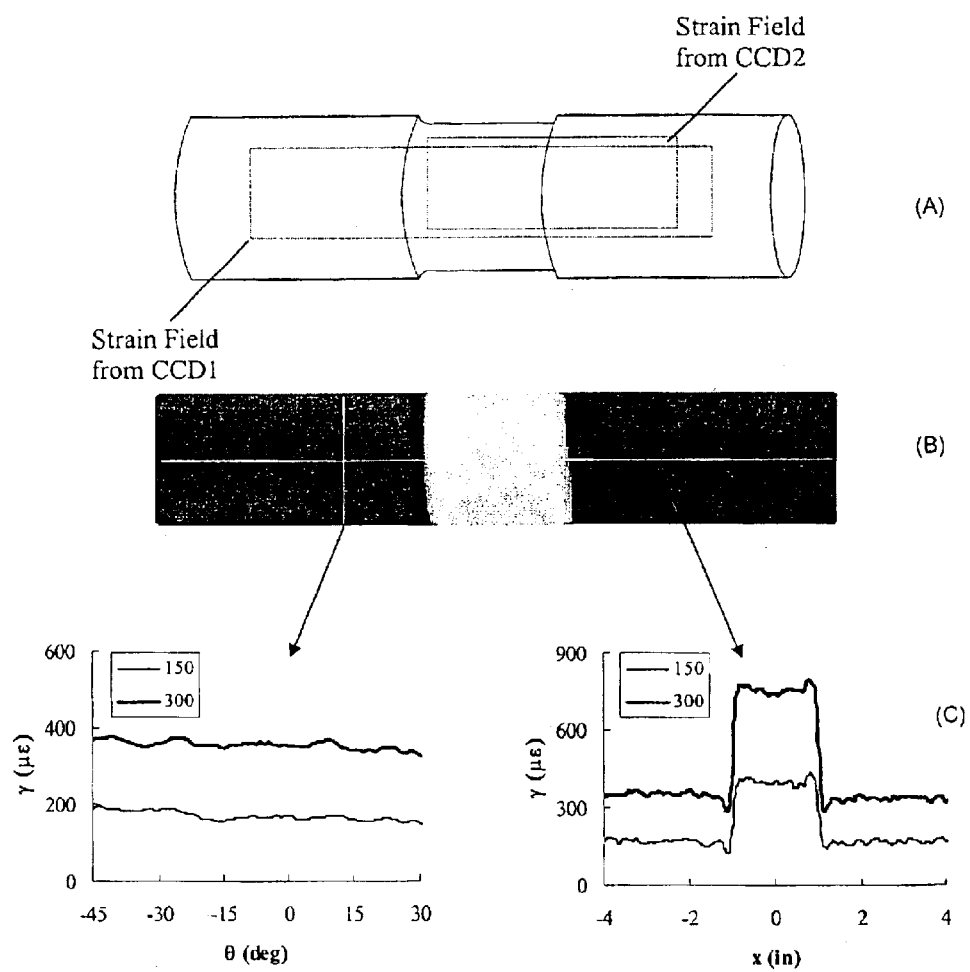
FIG. 9A illustrates a cylinder having a thinned section to provide a stress concentration area.
FIG. 9B is an image showing processed strain results for the cylinder shown in FIG. 9A with an applied torsional load. Results from two overlapping regions by two different CCD imagers are shown where low strain is indicated by dark gray and high strain is indicated by light gray.
FIG. 9C illustrates strain measurement with respect to azimuthal position (θ-deg) and axial position (x-in) for two torsional loads applied to the cylinder shown in FIG. 9A.

FIG. 9A illustrates a cylinder having a thinned section to provide a stress concentration area. FIG. 9B shows processed strain results for the cylinder shown in FIG. 9A with an applied torsional load taken along the azimuthal (−45 to 30 deg) and axial directions of the cylinder for two torque values (150 and 300 ft-lbs). As to be expected, the measured shear strain field is constant, except at the neck down region were the shear strain is expected to increase. Results from two overlapping regions by two different CCD imagers are shown where low strain is indicated by dark gray and high strain is indicated by light gray. FIG. 9C illustrates strain measurement with respect to azimuthal position ($\theta$-deg) and axial position (x-in) for two torsional loads applied to the cylinder.

Example 5

Shear Strain Data on Complex Geometry

Figure 10:
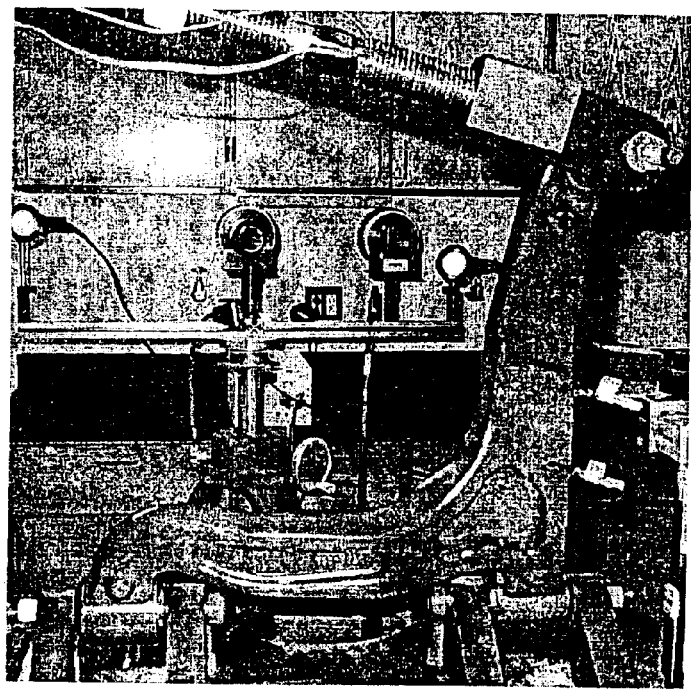
FIG. 10A. illustrates a three-dimensional component coated with a luminescent photoelastic coating. The component is attached to a loading apparatus to apply a force and induce a strain.
FIG. 10B is an image showing processed strain results for the three-dimensional component shown in FIG. 10A under an applied force.
Figure 10:
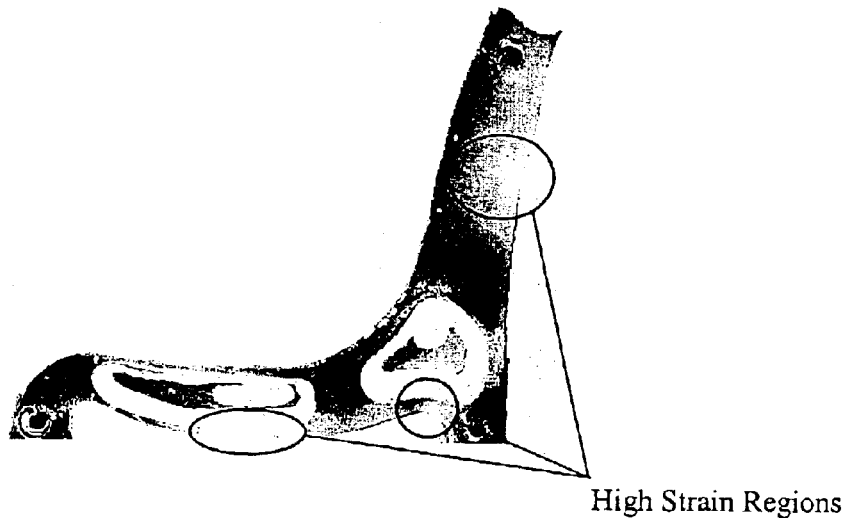

A three-dimension component shown in FIG. 10A, was degreased and prepared for the undercoat and overcoat application of a two-coating luminescent photoelastic coating. The specimen was excited using a blue LED lamp ($\lambda$=465 nm) coupled with a linear polarizer and quarter wave plate. A 600 nm (40 nm bandpass) interference filter was used on the CCD imager to detect and record the emission intensity. Images were acquired at four analyzer positions for each applied static load condition. FIG. 10B shows processed strain results for a given applied load. The relative pixel density is −10/cm. Regions of high shear are clearly visible as indicated by the light areas. These are generally located near the regions of high net tensile or compressive regions. Thickness variation of the coating was corrected by the collecting the coating emission from nonpolarized light using 10 nm bandpass interference filters and using an a priori thickness calibration by ratioing the two intensity images and comparing the response to pointwise thickness measurements using a eddy-current thickness probe.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A method for measuring strain, comprising the steps of:
   providing a substrate surface coated with at least one coating layer, said coating layer including at least one luminophore for providing luminescence and at least one photoelastic material for providing photoelasticity;
   illuminating said coating layer with polarized excitation light having a first polarization state, wherein longer wavelength light is emitted having a second polarization state which is modified from said first polarization state by said photoelastic material by passage through said coating dependent upon stress or strain in said coating layer;
   measuring said second polarization state, and
   determining strain on said substrate surface from said second polarization state relative to said first polarization state.

2. The method of claim 1, wherein said photoelastic material comprises at least 40% by weight of said coating.

3. The method of claim 1, wherein said luminophore is a polarization preserving material.

4. The method of claim 1, wherein said coating layer is optically transparent in at least a portion of the visible light range.

5. The method of claim 1, wherein said photoelastic material provides a strain optic sensitivity at least equal to a strain optic sensitivity provided by BGM.

6. The method of claim 1, wherein said polarized light comprises elliptically polarized light.

7. The method of claim 1, wherein said characteristic comprises at least one selected from the group consisting of the maximum principal strain, the minimum principal strain and the maximum shear strain on said substrate surface.

8. The method of claim 1, wherein said characteristic comprises directions of maximum principal strain and the minimum principal strain on said substrate surface.

9. The method of claim 1, wherein said coating layer consists of only a single layer.

10. method of claim 1, wherein said at least one coating layer comprises at least two layers, said at least two layers comprising a luminescent layer disposed on said substrate surface and a photoelastic layer disposed on said luminescent layer.

11. The method of claim 10, wherein said luminescent layer includes a first luminophore and said photoelastic coating includes a second luminophore, wherein said first and second luminophore provide different emission wavelengths.

12. The method of claim 11, wherein an emission wavelength of said first luminophore corresponds to an absorption spectrum of said second luminophore.

13. The method of claim 1, further comprising the step of optical filtering to selectively pass said higher wavelength light and reject said excitation light.

14. The method of claim 1, wherein said illuminating step comprises a process comprising oblique incidence, said determining step providing individual values for maximum principal strain and minimum principal strain on said substrate exclusively using said method.

15. The method of claim 1, further comprising the step of scanning said excitation light across said substrate surface, wherein regions of high strain are identified.

16. An apparatus for measuring strain, comprising:
    an excitation light source for illuminating a surface of a substrate with polarized excitation light having a first polarization state, said substrate including a coating which provides at least one luminophore for providing luminescence and at least one photoelastic material for providing photoelasticity;
    a detector for measuring light emitted by said substrate surface responsive to said excitation light, said emitted light being at a longer wavelength and having a second polarization state which is modified from said first polarization state by said photoelastic material by passage through said coating as compared to said, and
    a computer for determining strain on said substrate surface from said second polarization state relative to said first polarization state.

17. The apparatus of claim 16, wherein said polarized light is elliptically polarized light.

18. The apparatus of claim 16, wherein said computer provides at least one selected from the group consisting of the maximum principal strain, the minimum principal strain and the maximum shear strain on said substrate surface.

19. The apparatus of claim 16, wherein said wherein said computer provides directions of maximum principal strain and the minimum principal strain on said substrate surface.

20. The apparatus of claim 16, further comprising a linear polarizer or a combination of a quarter wave plate and linear polarizer disposed between said object and said detector.

21. A coating for indicating strain of an underlying surface, comprising:
    at least one coating layer, said coating layer being optically transparent in at least a portion of the visible light range and including at least one luminophore for providing luminescence and at least one photoelastic material for providing photoelasticity, wherein said coating layer emits longer wavelength light having an altered polarization responsive to illumination with polarized excitation light.

22. The coating of claim 21, wherein said luminophore is a polarization preserving luminophore.

23. The coating of claim 21, wherein said coating layer consists of a single layer.

24. The coating claim 21, wherein said at least one coating layer comprises at least two layers, said at least two layers comprising a luminescent layer disposed on said substrate surface and a photoelastic layer disposed on said luminescent layer.

25. The coating of claim 24, wherein said luminescent layer includes a first luminophore and said photoelastic coating includes a second luminophore, wherein said first and second luminophore provide different emission wavelengths.

26. The coating of claim 25, wherein an emission wavelength of said first luminophore corresponds to an absorption spectrum of said second luminophore.

27. The coating of claim 21, wherein said coating layer comprises a bisphenol A diglycidyl ether or a bisphenol A glycerolate diacrylate based polymer.

28. A coated structural member, comprising:
    a substrate having a substrate surface, and
    a coating layer disposed on said substrate surface, said coating layer being optically transparent in at least a portion of the visible light range and including at least one luminophore for providing luminescence and at least one photoelastic material for providing photoelasticity, wherein said coating layer emits longer wavelength light having an altered polarization responsive to illumination with polarized excitation light.

29. The coated member of claim 28, wherein said luminophore is a polarization preserving luminophore.

30. The coated member of claim 28, wherein said coating layer consists of only a single layer.

31. The coated member claim 28, wherein said coating layer comprises at least two layers, said at least two layers comprising a luminescent layer disposed on said substrate surface and a photoelastic layer disposed on said luminescent layer.

32. The coated member of claim 31, wherein said luminescent layer includes a first luminophore and said photoelastic coating includes a second luminophore, wherein said first and second luminophore provide different emission wavelengths.

33. The coated member of claim 32, wherein an emission wavelength of said first luminophore corresponds to an absorption spectrum of said second luminophore.

34. The coated member claim 28, wherein said coating layer comprises a bisphenol A diglycidyl ether or a bisphenol A glycerolate diacrylate based polymer.

35. A method for real-time monitoring of strain on surfaces of mechanical components, comprising the steps of:

providing a mechanical element having at least one surface, said surface including at least one coating layer for indicating strain on said surface, said coating layer being optically transparent in at least a portion of the visible light range and including at least one luminophore for providing luminescence and at least one photoelastic material for providing photoelasticity, wherein said coating layer emits longer wavelength light having an altered polarization dependent upon stress or strain on said coating responsive to illumination with polarized excitation light;

utilizing said mechanical element in a stress inducing application;

monitoring strains developed on said mechanical element during said utilizing step, said monitoring step comprising illuminating said surface with said polarized excitation light having a first polarization state, and measuring a second polarization state of said emitted light, and determining strain on said surface from said second polarization state relative to said first polarization state.

36. The method of claim 35, wherein said photoelastic material comprises at least 40% by weight of said coating layer.

37. The method of claim 36, wherein said coating layer comprises at least two layers, said at least two layers comprising a luminescent layer disposed on said substrate surface and a photoelastic layer disposed on said luminescent layer, said luminescent layer including a first luminophore and said photoelastic coating includes a second luminophore, wherein said first and second luminophore provide different emission wavelengths.

38. The method of claim 37, wherein an emission wavelength of said first luminophore corresponds to an absorption spectrum of said second luminophore.

* * * * *